United States Patent
Sato et al.

[11] Patent Number: 5,949,626
[45] Date of Patent: Sep. 7, 1999

[54] MAGNETIC HEAD HAVING A C-TYPE CORE AND AN I-TYPE CORE

[75] Inventors: Masashi Sato; Hiroshi Sampei, both of Yamagata, Japan

[73] Assignee: Mitsumi Electric Company, Ltd., Tokyo, Japan

[21] Appl. No.: 08/901,631

[22] Filed: Jul. 28, 1997

[30] Foreign Application Priority Data

Jul. 30, 1996 [JP] Japan ................................ 8-216782

[51] Int. Cl.6 .................................................. G11B 5/187
[52] U.S. Cl. .......................................... 360/125; 360/122
[58] Field of Search .................................. 360/103, 119, 360/122, 125, 126

[56] References Cited

U.S. PATENT DOCUMENTS

| | | | |
|---|---|---|---|
| 4,926,276 | 5/1990 | Orikasa et al. ........................ | 360/126 |
| 4,939,608 | 7/1990 | Okamura et al. ..................... | 360/121 |
| 4,939,609 | 7/1990 | Zieren et al. ......................... | 360/125 |
| 5,148,343 | 9/1992 | Sugawara et al. .................... | 360/122 |
| 5,157,569 | 10/1992 | Kumasaka et al. .................. | 360/126 |
| 5,245,488 | 9/1993 | Iwamoto et al. ..................... | 360/119 |
| 5,276,959 | 1/1994 | Yamamoto ............................ | 29/603 |
| 5,717,543 | 2/1998 | Ito et al. ............................... | 360/103 |
| 5,726,842 | 3/1998 | Mori et al. ............................ | 360/126 |

*Primary Examiner*—Jefferson Evans
*Attorney, Agent, or Firm*—Whitham, Curtis & Whitham

[57] ABSTRACT

A magnetic head 10 includes a pair of a C-type core 11 and an I-type core 12 which are butt-joined together, a gap section 14 defined between the butt-joined surfaces of the cores, track width regulating grooves 11b, 12b which are formed in a magnetic medium slide surface so as to limit the width of the gap 14 to a predetermined width, and bonding glass 16 bonded to the track width regulating grooves. The I-type core has track width regulating grooves which extend from the butt-joined surface to the outer side surface within at least the magnetic medium slide surface, and a reinforcing member 15 is attached to the outer side surface of the I-type core, so that the magnetic medium slide surface is extended.

7 Claims, 5 Drawing Sheets

MAGNETIC HEAD HAVING A C-TYPE CORE AND AN I-TYPE CORE

BACKGROUND OF THE INVENTION

1. Field of the Invention

The present invention relates to a magnetic head used in magnetic recorders, e.g., video tape recorders (VTR), digital video cassettes (DVC), digital audio tape recorders.

2. Related Art

An existing magnetic head used in VTRs has a configuration as shown in FIG. 6.

A magnetic head 1 shown in FIG. 6 is a so-called ferrite bulk magnetic head which consists of a pair of ferrite cores. Namely, the head is formed by bonding together a C-type core 2 and a C-type core 3 by bonding glass 4 while they are positioned so as to be opposite to each other, whereby a gap 5 is formed so as to have a predetermined width. A coil (not shown) is wound around winding grooves 2a, 3a formed in respective cores 2, 3.

More specifically, as shown in FIG. 7, track width regulating grooves 2b, 3b are formed in both side surfaces of the cores 2, 3 so that the gap 5 can be formed to have a desired width. The track width regulating grooves 2b, 3b are filled with the bonding glass 4 the instant the cores 2, 3 are butt-joined together.

A tape slide surface A is defined in such a way that the gap 5 formed between the track width regulating grooves 2b, 3b is surrounded by the upper surfaces of the cores 2, 3 and the upper surface of the bonding glass 4.

There are also known so-called MIG (Metal-in-Gap) magnetic heads having a construction as shown in FIG. 8.

In FIG. 8, a MIG magnetic head 6 is comprised of a pair of Mn-Zn ferrite C-type cores 7, 8. Surfaces of the C-type cores 7, 8 to be butt-joined are coated with magnetic metal films 7a, 8a, and the surfaces are bonded by the bonding glass 4 while they are opposite to each other, whereby a gap 9 having a predetermined width is formed. A coil (not shown) is wound around each of winding grooves 7b, 8b formed in the respective C-type cores 7, 8.

More specifically, as shown in FIG. 9, track width regulating grooves 7c, 8c are formed in both side surfaces of the C-type cores 7, 8 so that the gap 9 can be formed to have a desired width. Magnetic metal films 7a, 8a are formed on the surfaces of the C-type cores 7, 8 to be butt-joined, and the track width regulating grooves 7c, 8c are filled with the bonding glass 4 the instant the C-type cores 7, 8 are butt-joined together.

A tape slide surface A is defined in such a way that the gap 9 formed between the track width regulating grooves 7c, 8c is surrounded by the upper surfaces of the C-type cores 7, 8 and the upper surface of the bonding glass 4.

Both types of magnetic heads 1, 6 present the following problems.

With regard to the magnetic heads 1, 6, the C-type cores 3, 8 have comparatively large widths, so that the magnetic heads 1, 6 have large inductance. Further, the tape slide surface is made up of the C-type cores 2, 3 or 7, 8 consisting of, e.g., ferrite, and hence it is abraded to a comparatively large extent. As a result, the recording/playback characteristics of the magnetic head are deteriorated.

The C-type cores 2, 3 or 7, 8 are joined together after the track width regulating grooves 2b, 3b or 7c, 8c have been formed. Therefore, as shown in FIG. 7 or 9, the track width regulating grooves 2b, 3b or 7c, 8c of the C-type cores 2, 3 or 7, 8 are shifted from each other. Leakage of the magnetic flux occurring in a track deviation "d" may cause noise when the magnetic head 1 or 6 carries out recording or playback, thereby obstructing correct recording or playback of a signal. Particularly, a magnetic head having a narrow track width, such as a DVC, has the risk of being unable to effect recording or playback by the track deviation "d."

SUMMARY OF THE INVENTION

The present invention has been conceived in terms of the foregoing problem, and the object of the invention is to provide a magnetic head which has improved abrasion resistance characteristics and prevents a track deviation.

The foregoing object is achieved by a magnetic head including a C-type core and an I-type core which are butt-joined together, a gap section defined between the butt-joined surfaces of the cores, track width regulating grooves which are formed in a magnetic medium slide surface so as to limit the width of the gap to a predetermined width, and bonding glass bonded to the track width regulating grooves, the magnetic head comprising:

the I-type core which has track width regulating grooves extending from the butt-joined surface to the outer side surface at least within the magnetic medium slide surface; and a reinforcing member which is attached to the outer side surface of the I-type core, so that the magnetic medium slide surface is extended.

Preferably, the track width regulating groves are formed after the I-type core and the C-type core have been butt-joined together.

Preferably, the reinforcing member is formed from a material harder than the cores; e.g., titania-based ceramics.

With the foregoing arrangement, since the I-type core is reinforced by a non-magnetic reinforcing member, it is narrowly formed, thereby resulting in a reduction in the inductance of the magnetic head. As a result, the recording/playback characteristics are improved.

If the track width regulating grooves are formed after the C-type core and the I-type core have been joined together, they are correctly in alignment with each other without a deviation in the gap formed between the grooves. Therefore, there is prevented the leakage of a magnetic flux which would otherwise be caused by the deviation of the gap, thereby resulting in a reduction in noise due to the leakage of a magnetic flux.

For a case where the reinforcing member is made of a material harder than a core, the abrasion of the magnetic medium sliding surface which would otherwise be caused by relative traveling of a magnetic medium such as a magnetic tape or a magnetic disk is suppressed, thereby resulting in improvements in the abrasion resistance characteristics of the magnetic head.

DETAILED DESCRIPTION OF THE PREFERRED EMBODIMENTS

With reference to an embodiment illustrated in the accompanying drawings, the present invention will be described in detail hereinbelow.

Figure 1:
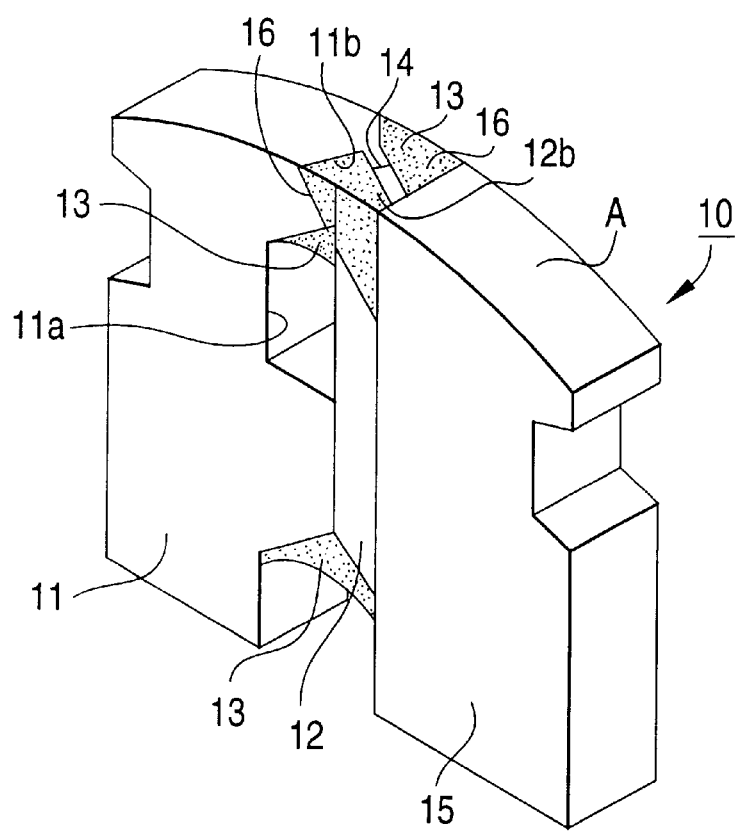
FIG. 1 is a schematic perspective view illustrating one embodiment of a magnetic head according to the present invention.

FIG. 1 shows a first embodiment of a magnetic head of the present invention.

In FIG. 1, a magnetic head 10 is used for a VTR and is comprised of a pair of ferrite cores; namely, a C-type core 11 and an I-type core 12, which are bonded together by bonding glass 13. A gap 14 having a predetermined width is formed between the cores 11, 12, and a coil (not shown) is wound around a wiring groove 11a formed in the C-type core 11. A reinforcing member 15 is bonded to the outside of the I-type core 12, thereby constituting the magnetic head 10.

Figure 2:
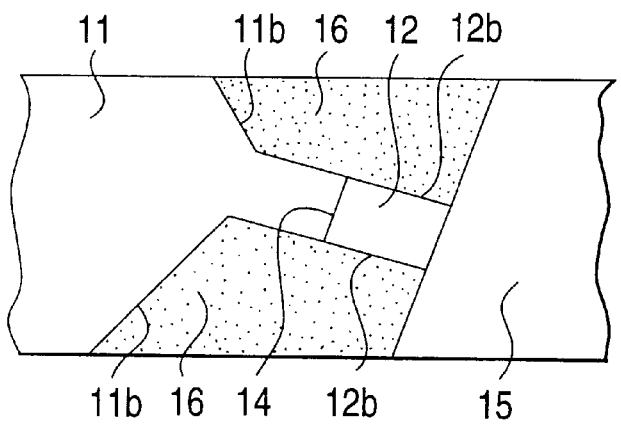
FIG. 2 is a enlarged fragmentary view illustrating the principal portion of the magnetic head shown in FIG. 1.

As shown in FIG. 2, while the cores 11, 12 are bonded together, track width regulating grooves 11b, 12b are formed on both sides of the cores 11, 12 so as to form the gap 14 having a desired width. The reinforcing member 15 is then bonded to the cores 11, 12, and the track width regulating grooves 11b, 12b are filled with bonding glass 16. As a result, a tape slide surface A is defined in such a way that the gap 14 formed between the track width regulating grooves 11b, 12b is surrounded by the upper surfaces of the cores 11, 12 and the upper surface of the bonding glass 13, 16.

Figure 3:
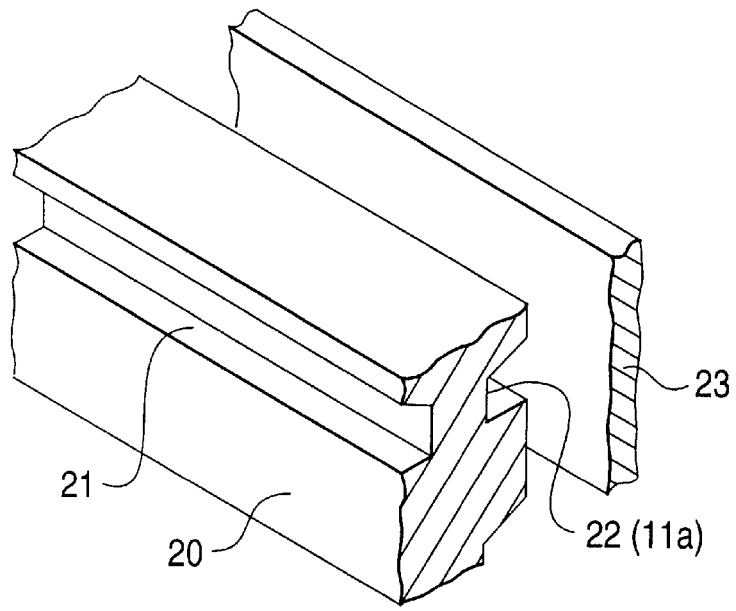
FIG. 3 is a schematic perspective view illustrating the first stage of the process of manufacture of the magnetic head shown in FIG. 1.
Figure 4:
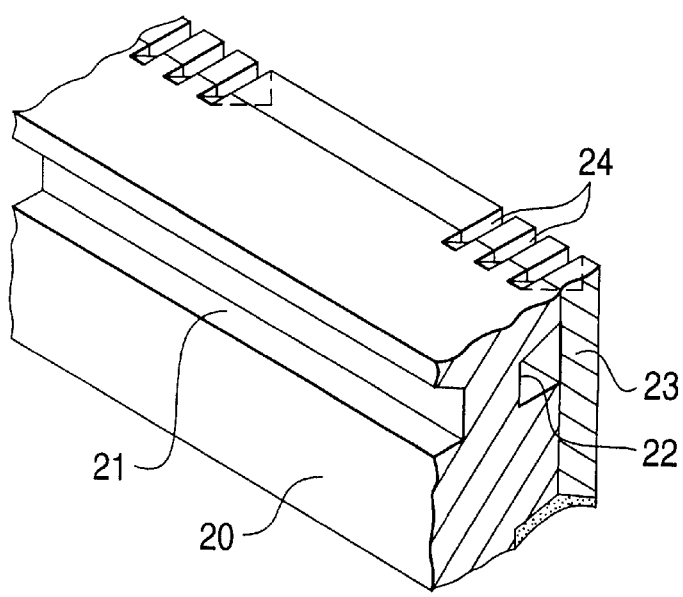
FIG. 4 is a schematic perspective view illustrating the second stage of the process of manufacture of the magnetic head shown in FIG. 1.
Figure 5:
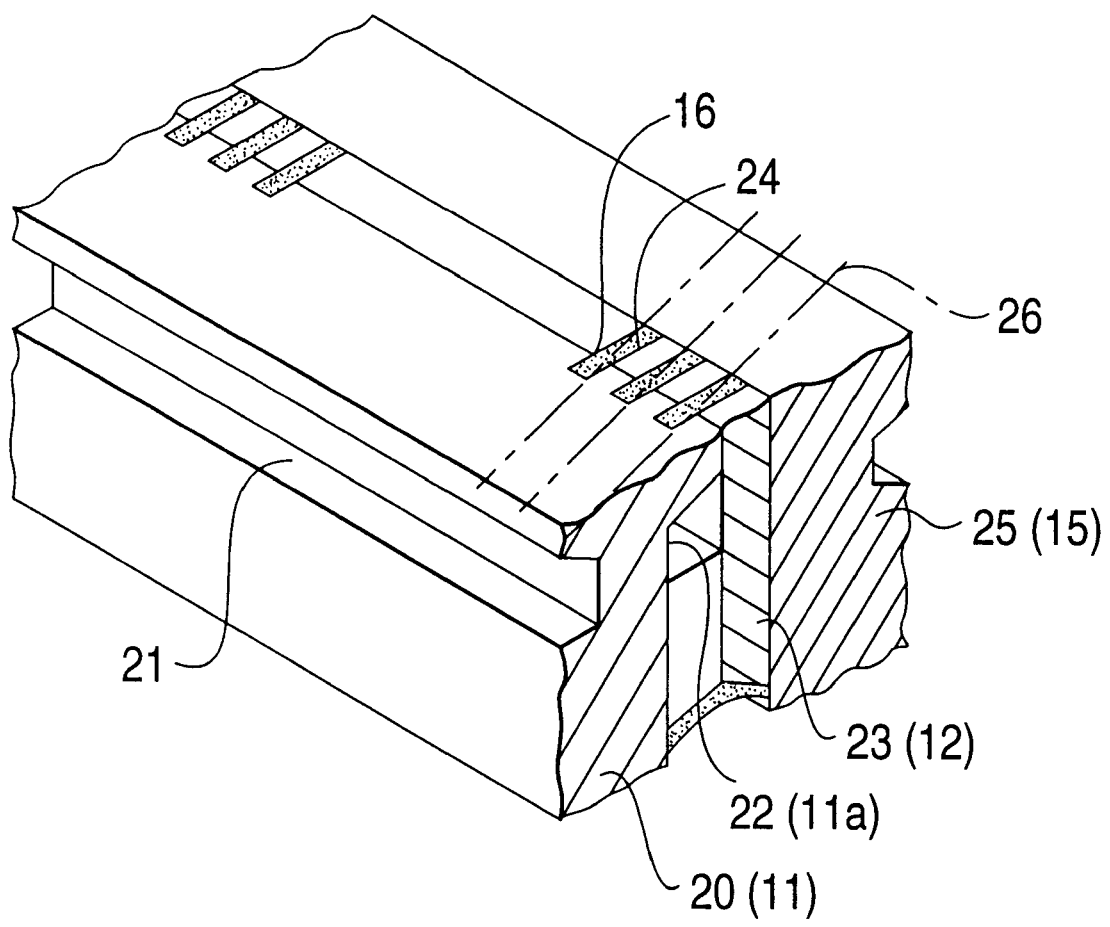
FIG. 5 is a schematic perspective view illustrating the third stage of the process of manufacture of the magnetic head shown in FIG. 1.
Figure 6:
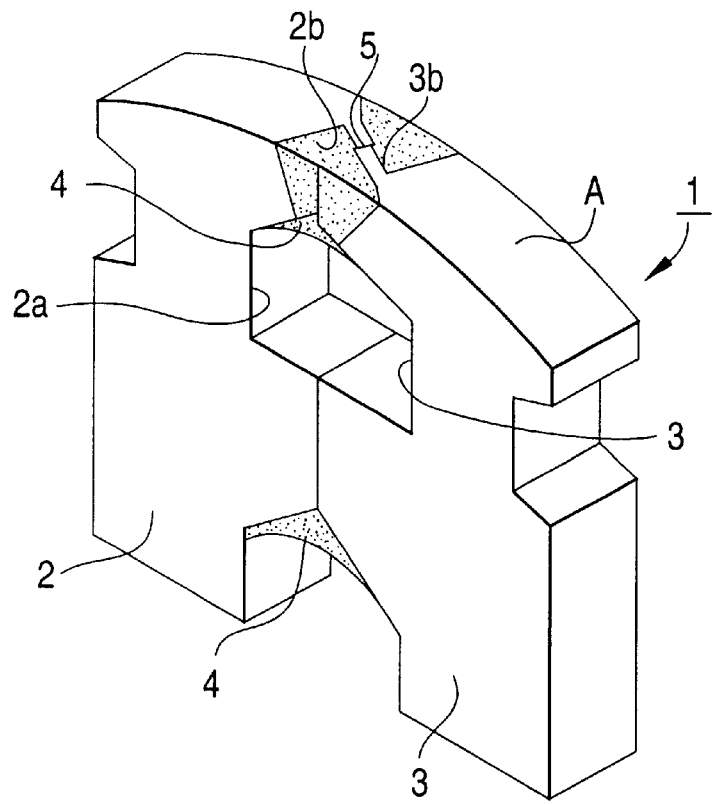
FIG. 6 is a schematic perspective view illustrating one example of an existing ferrite bulk magnetic head.
Figure 7:
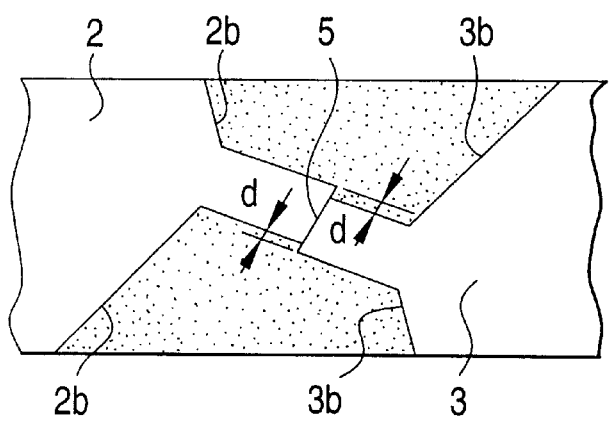
FIG. 7 is an enlarged fragmentary view illustrating the principal portion of the magnetic head shown in FIG. 6.
Figure 8:
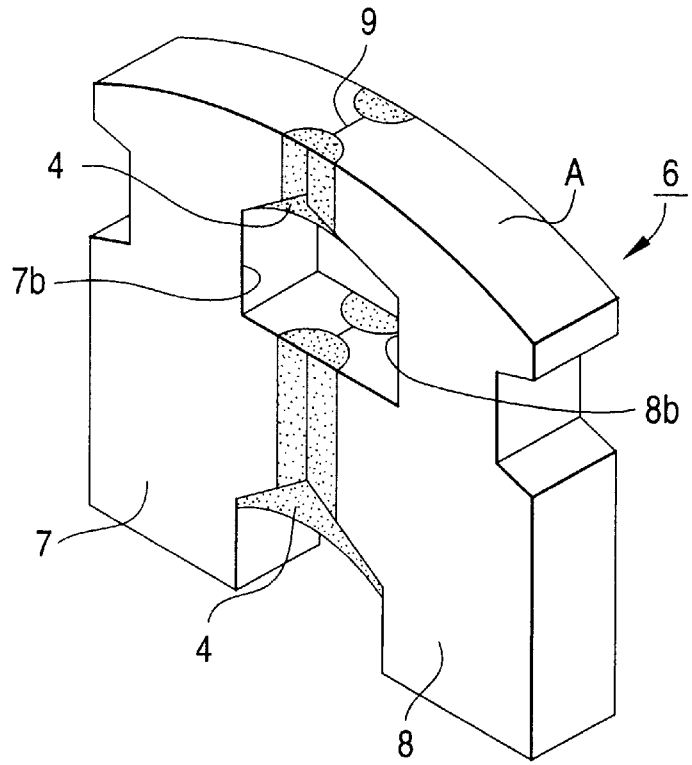
FIG. 8 is a schematic perspective view illustrating one example of existing MIG-type magnetic heads.
Figure 9:
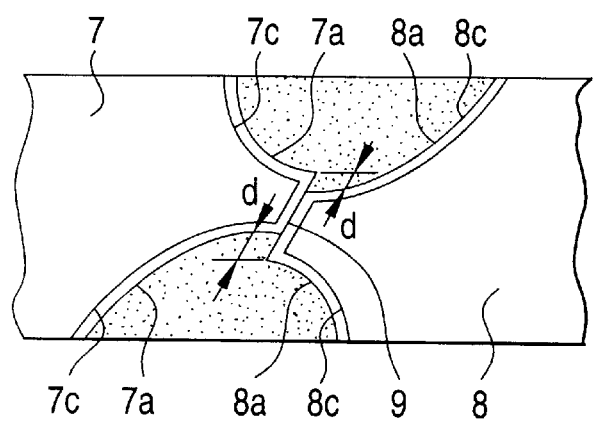
FIG. 9 is an enlarged fragmentary view illustrating the principal portion of the magnetic head shown in FIG. 8.

The magnetic head 10 is manufactured in the manner as shown in FIGS. 3 through 5.

As shown in FIG. 3, a winding guide 21 and a winding groove 22 (11a) are longitudinally formed in a core base material 20 which will form the core 11. A comparatively thin core base material 23 which will form the core 12 is bonded to the core base material 20 by the bonding glass 13.

As shown in FIG. 4, track width regulating grooves 24 are formed in the vicinity of the upper surfaces of the core base materials 20, 23 so as to downwardly extend to the outside of the core base material 23 at an angle. At this time, the track width regulating grooves 24 are obliquely and easily formed by linear machining.

Subsequently, as shown in FIG. 5, a reinforcing member 25 which consists of a non-magnetic material and will form a reinforcing member is bonded to the outside of the core base material 23, and the track width regulating grooves 24 are filled with the bonding glass 16.

Finally, the core base materials 20, 23 and the reinforcing member 25 are sliced into the magnetic heads 10 shown in FIG. 1 in parallel with each other along cutting lines 26 which are designated by dashed lines and diagonally cut across the track width regulating grooves 24 in the longitudinal direction thereof.

The magnetic head 10 of the present embodiment has the foregoing construction, and the width of the gap 14 defined between the butt-joined surfaces of the C-type core 11 and the I-type core 12 is determined by the track width regulating grooves 11b, 12b. A magnetic tape (not shown) travels in a slidable manner over a tape slide surface which is made up of the upper surfaces of the cores 11, 12, the bonding glass 13, 16 and the reinforcing member 15 of the magnetic head 10. Data magnetically recorded on the magnetic tape are converted into an electrical signal by a coil (not shown), and the electrical signal is then played back. In contrast, data are magnetically recorded on the magnetic tape by application of an electrical signal to the coil from the outside.

In this case, the track width regulating grooves 11b, 12b are formed after the C-type core 11 and the I-type core 12 have been bonded together, the gap 14 is free from a track deviation. Since the leakage of a magnetic flux due to the gap deviation does not occur, the noise due to the leakage of a magnetic flux is reduced. Further, a magnetic head having a narrow track width such as a DVC correctly effects recording/playback.

Since the I-type core 12 is reinforced by the reinforcing member 15, it is formed to have a narrow width, easily resulting in a reduction in the inductance of the magnetic head.

For the case where the reinforcing member 15 is formed from a material harder than the cores 11, 12, the abrasion characteristics; namely, the abrasion resistance characteristics of the magnetic head with respect to the traveling of the magnetic tape, are improved, which in turn results in stable recording/playback characteristics.

Although the magnetic head for VTR has been described in the foregoing embodiment, the present invention is not limited to magnetic heads for use as various types of magnetic heads but may be evidently applied to magnetic heads to be used with various types of magnetic mediums such as digital audio tapes or audio tapes.

As has been described above, since the I-type core is reinforced by the non-magnetic reinforcing member in the present invention, and it can be narrowly formed. Accordingly, the inductance of the magnetic head can be reduced, thereby resulting in improvements in the recording/playback characteristics.

The track width regulating grooves are formed in the cores after the C-type core and the I-type core have been bonded together, and hence they are correctly in alignment with each other without a deviation in the gap formed between the grooves. Therefore, there is prevented the leakage of a magnetic flux which would otherwise be caused by the deviation of the gap, thereby resulting in a reduction in noise due to the leakage of a magnetic flux.

For a case where the reinforcing member is made of a material harder than a core, the abrasion of the magnetic medium sliding surface which would otherwise be caused by relative traveling of a magnetic medium such as a magnetic tape or a magnetic disk is suppressed, thereby resulting in improvements in the abrasion resistance characteristics of the magnetic head.

Therefore, in the present invention, the magnetic head is arranged so as to improve the abrasion characteristics of the magnetic head are improved as well as to prevent a track deviation, and hence a very superior magnetic head is provided.

What is claimed is:

1. A magnetic head comprising:

a core formed by facing a C-type core and an I-type core which are butt-joined together;

a gap section defined between facing surfaces of the core;

track width regulating grooves formed in a magnetic medium slide surface so as to limit the width of the gap to a predetermined width, the track width regulating grooves being formed after the I-type core and the C-type core are butt-joined together and extending from the butt-joined surface to outer opposing side surfaces of said C-type core and side surfaces of said I-type core;

bonding glass bonded to the track width regulating grooves; and a reinforcing member attached to the outer side surface of the I-type core to form an extended portion of the magnetic medium slide surface, wherein a height of said reinforcing member is substantially equal to a height of said C-type core.

2. The magnetic head as defined in claim 1, wherein the reinforcing member is formed from a material harder than the cores.

3. The magnetic head as defined in claim 2, wherein the reinforcing member is formed from titania-based ceramics.

4. A magnetic head comprising:

a C-type core having a track regulating groove;

an I-type core having a track regulating groove, the C-type core facing the I-type core;

a gap section defined between facing surfaces of the C-type core and the I-type core, the gap section having a predetermined width being determined by the C-type core track regulating groove and the I-type core track;

bonding glass bonding to the track width regulating grooves of the C-type core and the I-type core track; and a reinforcing member attaching to the outer side surface of the I-type core to form an extended portion of the magnetic medium slide surface, wherein the track regulating grooves of the C-type core and the I-type core are formed after the C-type core and the I-type core are bonded together.

5. The magnetic head as defined in claim 4, wherein the gap section is free from a track deviation.

6. A magnetic head comprising an assembly of a base core material, a reinforcing member and an I-type core formed by a process comprising:

bonding the base core material having a winding guide and a winding groove to the I-type core bonding to the base core material;

forming a track regulating groove in the bonded base core material and the I-type core by obliquely machining the track regulating groove, the track width regulating grooves being formed after the I-type core and the base core material are bonded together and;

forming a gap between facing surfaces of the base core material and the I-type core, wherein the gap is free from any track deviation;

bonding the reinforcing member to a side surface of the I-type core opposing the base core material;

filling the track regulating groove with bonding material by discharging bonding material in the track regulating groove; and slicing the bonded base core material and the I-type core across the track regulating groove.

7. The magnetic head as defined in claim 6, wherein the base core material having a winding guide and a winding groove is formed into a C-type core after the core material and the I-type core are sliced across the track regulating groove.

* * * * *